(12) United States Patent
Bui

(10) Patent No.: US 8,999,276 B1
(45) Date of Patent: Apr. 7, 2015

(54) SYSTEM AND METHOD FOR MIXING OF FLUIDS

(71) Applicant: Caterpillar Inc., Peoria, IL (US)

(72) Inventor: Yung T. Bui, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/031,066

(22) Filed: Sep. 19, 2013

(51) Int. Cl.
*B01D 53/94* (2006.01)
*F01N 3/10* (2006.01)
*F01N 3/24* (2006.01)
*F01N 3/28* (2006.01)

(52) U.S. Cl.
CPC .............. *F01N 3/2882* (2013.01); *B01D 53/94* (2013.01)

(58) Field of Classification Search
USPC ......... 423/212, 213.2; 60/274, 276, 299, 301, 60/317; 366/101, 336, 340
See application file for complete search history.

(56) References Cited

U.S. PATENT DOCUMENTS

| 6,074,619 | A | * | 6/2000 | Schoubye | ................ 423/239.1 |
| 6,401,449 | B1 | * | 6/2002 | Hofmann et al. | ............... 60/274 |
| 7,533,520 | B2 | | 5/2009 | Cheng et al. | |
| 7,596,944 | B2 | | 10/2009 | Mueller et al. | |
| 8,141,353 | B2 | | 3/2012 | Zheng et al. | |
| 8,359,832 | B2 | | 1/2013 | Yi et al. | |
| 2010/0319329 | A1 | * | 12/2010 | Khadiya | ......................... 60/295 |
| 2011/0239631 | A1 | | 10/2011 | Bui et al. | |
| 2011/0283686 | A1 | | 11/2011 | Jebasinski | |
| 2012/0300577 | A1 | * | 11/2012 | Buttridge et al. | ............. 366/340 |
| 2014/0060015 | A1 | * | 3/2014 | Yan et al. | ........................ 60/286 |

FOREIGN PATENT DOCUMENTS

EP 2474720 7/2012

* cited by examiner

*Primary Examiner* — Timothy Vanoy
(74) *Attorney, Agent, or Firm* — John W. Stankiewicz

(57) ABSTRACT

A mixing element positioned at an exhaust outlet of a Selective Catalytic Reduction (SCR) module is provided. The mixing element includes a base plate having an upper surface and a lower surface. The base plate is configured to deflect a portion of a flow of a fluid around the upper surface thereof. The mixing element also includes a plurality of vanes attached to the lower surface of the base plate in a spaced apart arrangement. The plurality of vanes is configured to induce a swirling effect in a flow of the fluid received therebetween.

11 Claims, 5 Drawing Sheets

SYSTEM AND METHOD FOR MIXING OF FLUIDS

TECHNICAL FIELD

The present disclosure relates to a system and method for mixing one or more fluids, and more specifically the disclosure relates to a mixing element for homogenizing a flow of the one or more fluids.

BACKGROUND

Usually, an aftertreatment system is employed in an engine for treating an exhaust flow of the engine. The aftertreatment system reduces and/or converts constituents such as carbon monoxide, sulfur dioxide, nitrogen oxides and so on present in the exhaust flow into other compounds, such as $H_2O$ and $N_2$ as per emission requirements. The aftertreatment system utilizes one or more sensors located at varying locations along the aftertreatment system. For example, a nitrogen oxide, also referred to as NOx, sensor may be located upstream and/or downstream of a Selective Catalytic Reduction (SCR) module for measuring a concentration of nitrogen oxides present in the exhaust flow entering and/or exiting the SCR module, respectively.

The SCR module may contain one or more SCR catalysts. Once exiting the one or more SCR catalysts, the exhaust stream may contain localized areas of relatively higher and lower NOx concentration. The NOx sensor positioned downstream of the SCR module may sample a region of this non-uniform exhaust flow that is non-representative of the total NOx concentration of the exhaust flow exiting the SCR module. This may provide inaccurate nitrogen oxide content readings.

In known systems, a mixing element is located upstream of the SCR module to allow for mixing of a reductant or diesel exhaust fluid (DEF) with the exhaust flow. However, this arrangement does not provide mixing of the exhaust flow downstream of the SCR module to homogenize the uneven distribution of the nitrogen oxides present in the exhaust flow received by the NOx sensor positioned post the SCR module.

U.S. Pat. No. 8,141,353 discloses such an exhaust mixer for use in an engine exhaust system downstream from an additive injector. The mixer includes a first disc-shaped wall structure with a plurality of flow openings formed therein. The mixer also includes a second wall structure carrying a set of mixer vanes. The second wall structure includes a cone shape extending radially outwardly from and intersecting the first wall structure such that the first wall structure is frusto-conical in shape.

SUMMARY OF THE DISCLOSURE

In one aspect of the present disclosure, a mixing element positioned at an exhaust outlet of a Selective Catalytic Reduction (SCR) module is provided. The mixing element includes a base plate having an upper surface and a lower surface. The base plate is configured to deflect a portion of a flow of a fluid around the upper surface thereof. The mixing element also includes a plurality of vanes attached to the lower surface of the base plate in a spaced apart arrangement. The plurality of vanes is configured to induce a swirling effect in a flow of the fluid received therebetween.

In another aspect of the present disclosure, an aftertreatment system housing is provided. The system includes an exhaust inlet configured to receive an exhaust flow. The system includes a Selective Catalytic Reduction (SCR) module disposed within the housing such that the SCR module may introduce a reductant into the exhaust flow. The system includes a nitrogen oxide sensor disposed downstream of the SCR module. The nitrogen oxide sensor is configured to measure a nitrogen oxide content of the exhaust flow exiting the housing. The system also includes an exhaust outlet configured to emit the exhaust flow out of the housing. The system further includes a mixing element disposed between the SCR module and the nitrogen oxide sensor. The mixing element is disposed in fluid communication with the exhaust outlet. The mixing element is configured to substantially homogenize the exhaust flow upstream of the nitrogen oxide sensor. The mixing element includes a base plate having an upper surface and a lower surface. The base plate is configured to deflect a portion of a flow of a fluid around the upper surface thereof. The mixing element includes a plurality of vanes attached to the lower surface of the base plate in a spaced apart arrangement. The plurality of vanes is configured to induce a swirling effect in a flow of the fluid received therebetween.

In yet another aspect of the present disclosure, a method is provided. The method introduces an exhaust flow into an exhaust inlet of a housing. The method includes receiving the exhaust flow into a Selective Catalytic Reduction (SCR) catalyst disposed within the housing. The method includes introducing a reductant into the exhaust flow upstream of the SCR catalyst. The method includes receiving the exhaust flow from the SCR catalyst into an exit chamber of the housing. The method includes directing the exhaust flow towards an exhaust outlet of the housing. The directing the exhaust flow includes deflecting a portion of the directed exhaust flow away from the exhaust outlet. The directing the exhaust flow also includes receiving the deflected exhaust flow into a mixing element disposed within the housing. The directing the exhaust flow further includes inducing a swirling effect in the received exhaust flow.

Other features and aspects of this disclosure will be apparent from the following description and the accompanying drawings.

DETAILED DESCRIPTION

Figure 1:
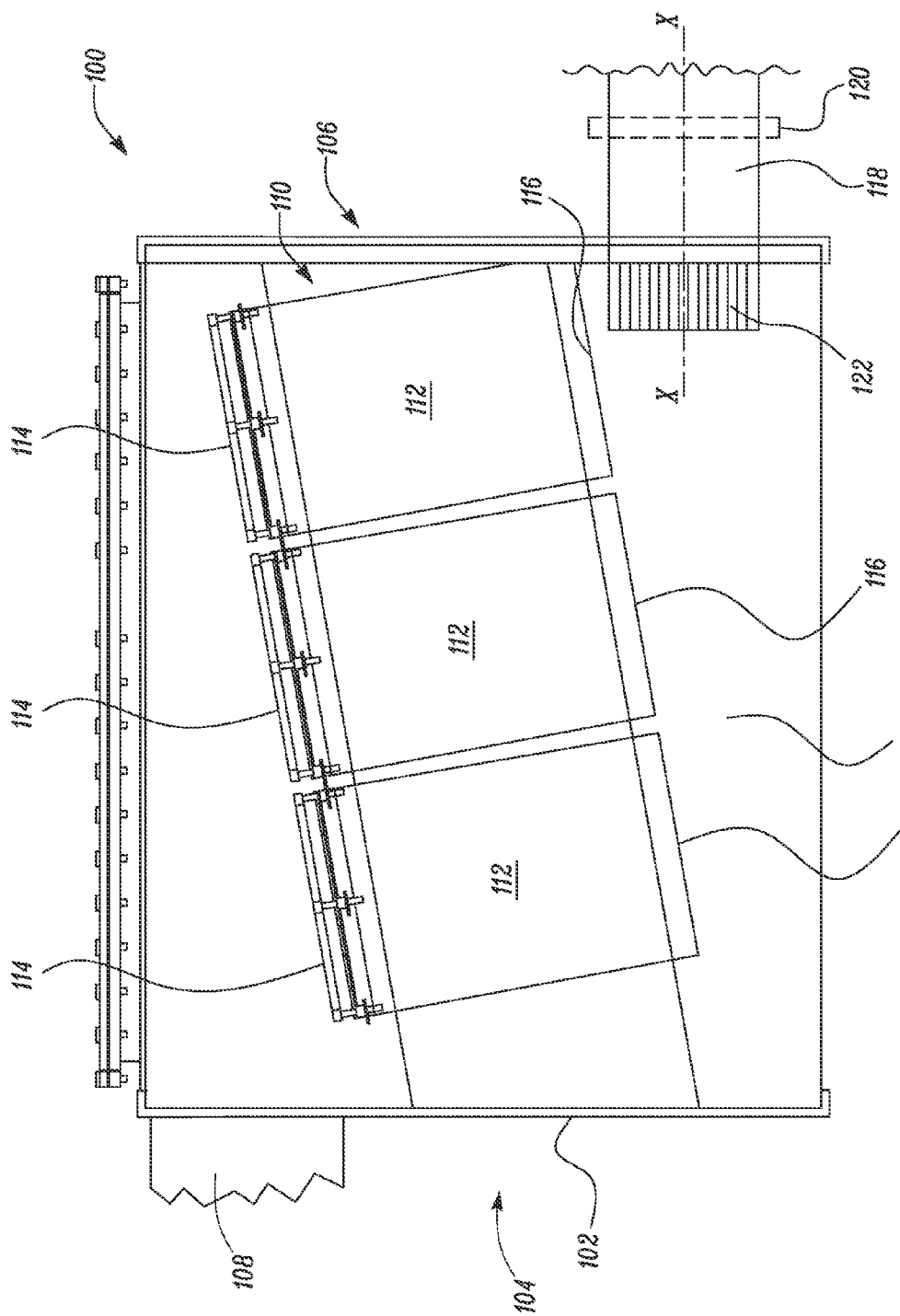
FIG. 1 is an exemplary module of an aftertreatment system.

Wherever possible, the same reference numbers will be used throughout the drawings to refer to the same or similar parts. Referring to FIG. 1, an exemplary module 100 of an aftertreatment system is illustrated. More specifically, the module 100 is illustrated as a Selective Catalytic Reduction (SCR) module, although one of ordinary skill in the art would recognize that the present disclosure may be applied to a variety of different modules. The module 100 is configured to introduce a reductant into a fluid, such as an exhaust flow of an engine (not shown). The exhaust flow may contain one or more constituents such as carbon monoxide, sulfur dioxide, nitrogen oxides and so on in gaseous state. In one embodiment, the module 100 may introduce a suitable reductant to reduce and/or convert an amount of nitrogen oxides (NOx)

present in the exhaust flow into other compounds using one or more chemical reactions and/or processes.

The module 100 includes a housing 102. The housing 102 includes a first end 104 and a second end 106. The housing 102 is configured to enclose and/or support one or more elements of the module 100. The first end 104 of the housing 102 includes an exhaust inlet 108. The exhaust inlet 108 is configured to receive the exhaust into the housing 102 from the engine or other aftertreatment components, such as, but not limited to, diesel oxidation catalysts, diesel particulate filters, etc. It should be noted that location of the module 100 in the aftertreatment system may vary as per system design and requirements.

The module 100 includes a bank of SCR catalysts 110 disposed within the housing 102. The bank of SCR catalysts 110 may include a plurality of individual SCR catalysts 112. Each of the plurality of SCR catalysts 112 may have similar dimensions and properties. In the illustrated embodiment, the bank of SCR catalysts 110 includes three cylindrical shaped SCR catalysts 112. A person of ordinary skill in the art will appreciate that the plurality of SCR catalysts 112 may vary based on the application. Moreover, each of the plurality of SCR catalysts 112 has a corresponding SCR inlet 114 and an SCR outlet 116.

The bank of SCR catalysts 110 is configured to receive the exhaust through the exhaust inlet 108. Each of the plurality of SCR catalysts 112 may include a generally cylindrical substrate fabricated from or otherwise coated with a ceramic material such as titanium oxide, a base metal oxide such as vanadium and tungsten, zeolites, and/or a precious metal. The SCR catalysts 112 may introduce the reductant into the exhaust. The reductant, and/or decomposition byproducts thereof, disposed on the SCR catalysts 112 may react with NOx present in the exhaust to form water ($H_2O$) and diatomic nitrogen ($N_2$). The exhaust may exit the bank of SCR catalysts 110 via the SCR outlet 116.

The exhaust may flow out of the SCR outlet 116 and enter into an exit chamber 117 defined within the housing 102. The exit chamber 117 may be fluidly connected to an exhaust outlet 118 provided on the second end 106 of the housing 102. The exhaust outlet 118 is configured to exit the exhaust leaving the bank of SCR catalysts 110 from the module 100. It should be noted that the housing 102 may additionally include a number of compartments or divisions in order to assist in directing the exhaust within the housing 102. Further, a NOx sensor 120 is provided in the exhaust outlet 118 and downstream of the bank of SCR catalysts 110. The NOx sensor 120 is configured to detect a concentration of nitrogen oxides or NOx content in the exhaust exiting the bank of SCR catalysts 110 through the SCR outlets 116. The location of the NOx sensor 120 within the exhaust outlet 118 may vary as per system configuration and requirements. For example, as shown in the accompanying figure, the NOx sensor 120 may be located in the exhaust outlet 118 at a suitable distance from the housing 102. Alternatively, the NOx sensor 120 may be located in the exhaust outlet 118 and in a plane corresponding to that of a wall of the housing 102 having the exhaust outlet 118.

It should be noted that the exhaust exiting the SCR outlets 116 may contain an uneven distribution of NOx. This may be due to each of the plurality of SCR catalysts 112 receiving a varying amount of the exhaust and/or reductant. For example, the SCR catalyst 112 disposed relatively closer to the exhaust inlet 108 may receive a higher amount of the exhaust as compared to the SCR catalyst 112 disposed farther away from the exhaust inlet 108 or vice versa. Accordingly, the exhaust exiting the each of the plurality of SCR catalysts 112 may contain a varying concentration of residual NOx after a catalytic reduction in the respective SCR catalyst 112.

Alternatively, or in addition, exhaust may become laminarized along the conduit on which the NOx sensor 120 is disposed. The exhaust may have different NOx concentrations at different distances away from the exhaust conduit. Laminarization of the exhaust may be prevented by the present disclosure.

Referring to FIG. 1, the module 100 also includes a mixing element 122 having a longitudinal axis X-X. The mixing element 122 is disposed at least partially within the housing 102. The mixing element 122 is provided in fluid communication with the exhaust outlet 118. The mixing element 122 is configured to provide mixing and homogenization of the exhaust exiting from the each of the plurality of SCR catalysts 112 prior to the exhaust entering into the NOx sensor 120. Accordingly, the mixing element 122 is provided downstream of the SCR outlets 116 and upstream of the NOx sensor 120 relative to the exhaust direction.

Figure 2:
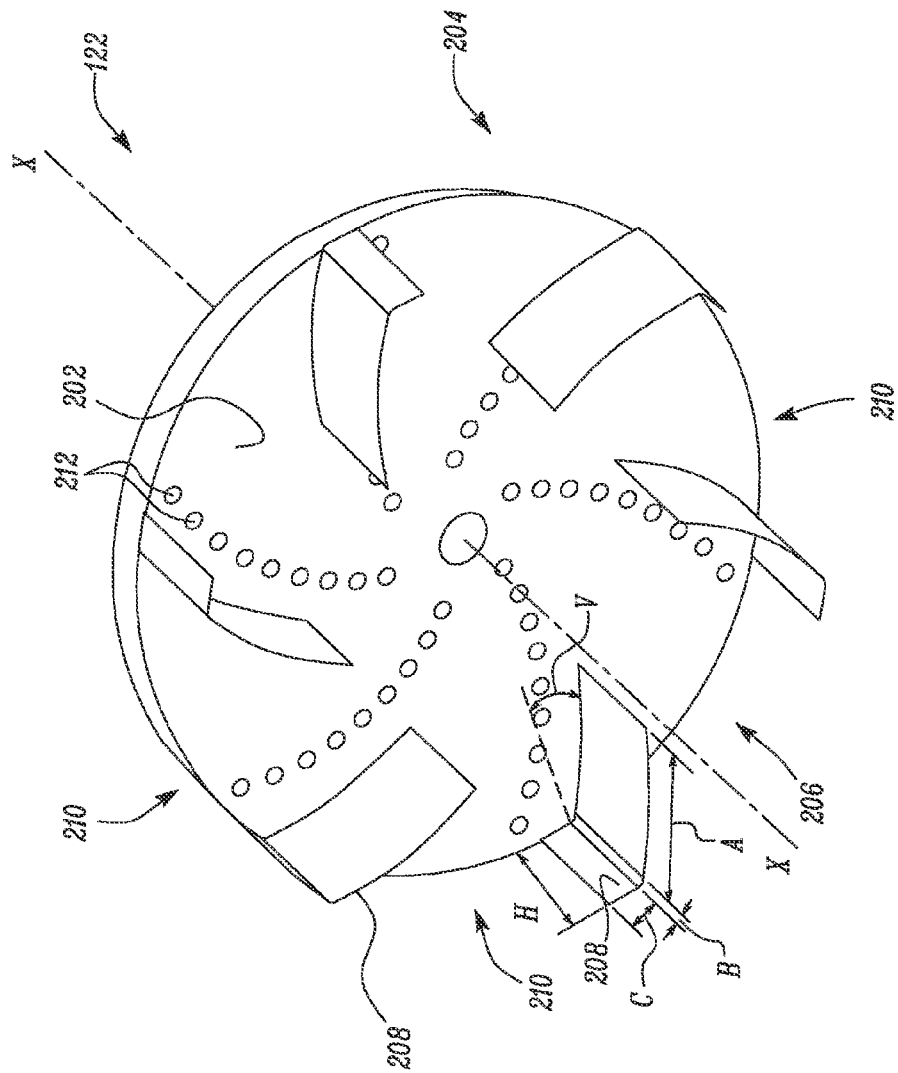
FIG. 2 is a perspective view of an exemplary embodiment of a mixing element.
Figure 3:
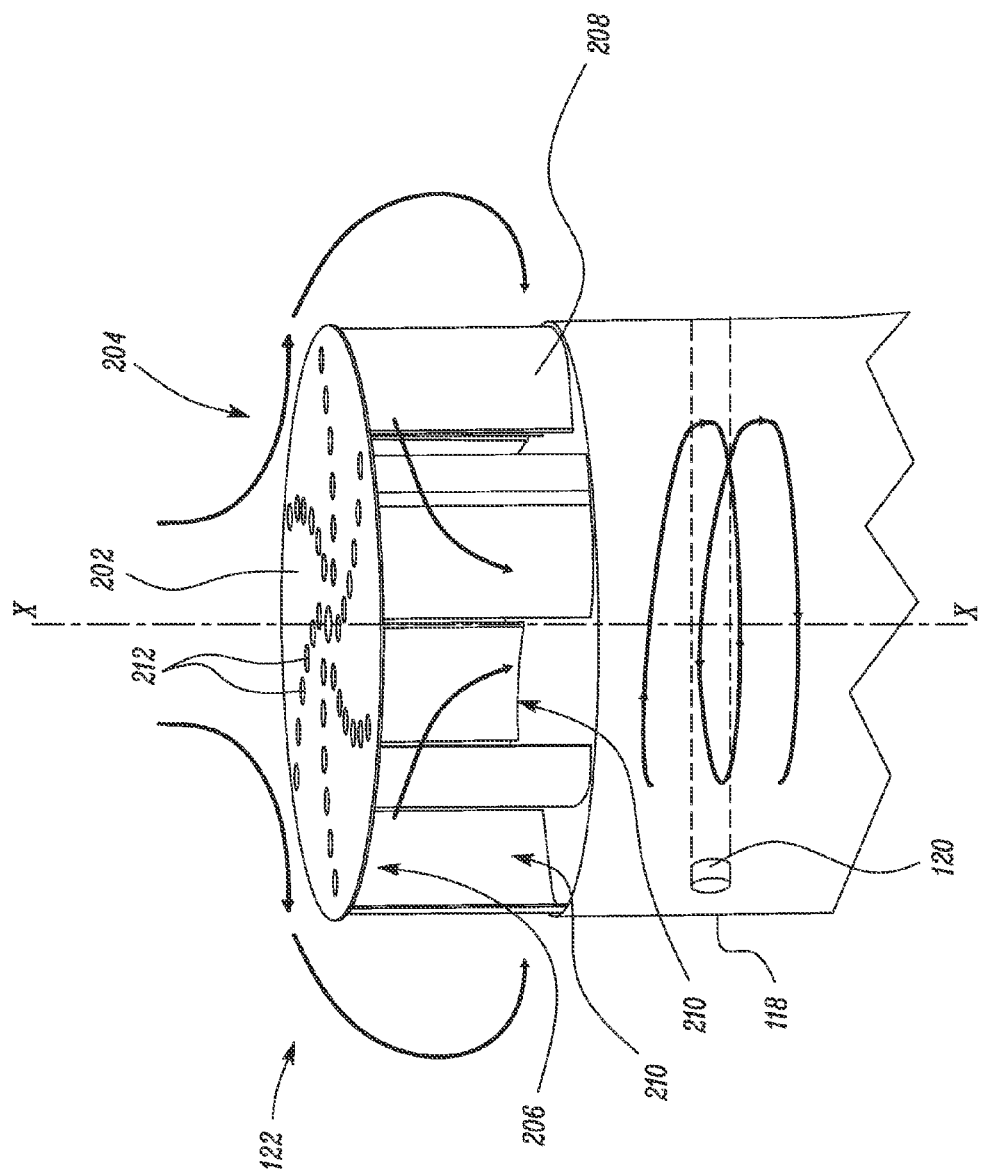
FIG. 3 is a side view of the exemplary embodiment of a mixing element showing a flow of a fluid therethrough.

FIG. 2 illustrates a perspective view of the mixing element 122. The mixing element 122 includes a base plate 202 having an upper surface 204 and a lower surface 206. In the illustrated embodiment, the base plate 202 has a circular plate like configuration having a diameter. The diameter of the base plate 202 may be substantially equal to or lesser than a diameter of the exhaust outlet 118. In another embodiment, the base plate 202 may have a rectangular or a triangular configuration having suitable dimensions. It should be noted that the configuration and dimensions of the base plate 202 may vary as per system requirements. The base plate 202 is configured to deflect a portion of the exhaust exiting the SCR outlets 116 away from the mixing element 122 and into the exit chamber 117 defined within the housing 102. As shown in FIG. 3, the base plate 202 deflects the exhaust substantially perpendicular to the longitudinal axis X-X of the mixing element 122.

Referring to FIG. 2, the base plate 202 includes a plurality of vanes 208 fixedly attached to the lower surface 206 of the base plate 202. The plurality of vanes 208 is provided perpendicular to the base plate 202 and in a circumferentially spaced apart arrangement with respect to the base plate 202. Each of the plurality of vanes 208 has a substantially curved configuration. The curved configuration of the each of the plurality of vanes 208 defines a vane angle "V" with respect to the longitudinal axis X-X and/or a circumference of the base plate 202. The curved configuration of the each of the plurality of vanes 208 is provided to induce a swirling effect in a portion of the exhaust received therebetween. The swirling effect created in the exhaust may lead to the homogenization of the exhaust such that the exhaust may now contain an even distribution of the NOx content. It should be noted that the mixing element 122 is at least partially positioned within the housing 102 so as to receive the portion of the exhaust from the exit chamber 117 of the housing 102.

As shown in FIG. 2, in one embodiment, the plurality of vanes 208 are disposed such that a leading edge of each of the plurality of vanes 208 face an outside of the base plate 202. Also, the plurality of vanes 208 may be positioned substantially equidistant from one another about a periphery of the base plate 202. A number of windows 210 are defined between the each of the plurality of vanes 208. As shown in FIG. 3, each of the windows 210 is configured to receive at least a portion of the exhaust deflected by the base plate 202. In one embodiment, the plurality of vanes 208 may have an airfoil shaped cross section. In another embodiment, the plurality of vanes 208 may have a partial C-shaped or a bent plate like configuration. It should be noted that the cross sectional shape of the plurality of vanes 208 may vary as per system design and requirements.

Dimensional parameters of the plurality of vanes 208 such as the vane angle "V" associated with the each of the plurality of vanes 208, a spacing between adjacent vanes 208, a height "H" of the each the plurality of the vanes 208, curve lengths "A", "B" and "C" associated with the each of the plurality of the vanes 208 and/or the shape of the cross section of the each of the plurality of vanes 208 may vary as per system configuration. These dimensional parameters may be selected based on a required intensity of the swirling effect to be created in the exhaust and also based on the aftertreatment system with which the mixing element 122 is associated. For example, the plurality of vanes 208 may have the vane angle "V" ranging from approximately 5 to 15 degrees, the height "H" ranging from approximately 3 to 5.5 inches, the curve length "A" ranging from approximately 50 to 180 millimeters, the curve length "B" ranging from approximately 7 to 10 millimeters, and the curve length "C" ranging from approximately 20 to 30 millimeters. It should be noted that dimensional ranges mentioned herein are exemplary and may vary as per system design and configuration.

Further, the plurality of vanes 208 is fixedly attached to the exhaust outlet 118 and/or an outlet of the housing 102 leading to the exhaust outlet 118, in order to attach the mixing element 122 to the exhaust outlet 118 and/or the housing 102 respectively. The homogenized exhaust may be directed to enter into the exhaust outlet 118. The plurality of vanes 208 may be attached to the exhaust outlet 118 and/or the housing 102 by any fastening means known in the art such as welding, brazing, soldering, bolting, riveting and so on.

Referring to FIG. 2, the base plate 202 may be provided with a plurality of perforations 212. A portion of the exhaust may be directly received into the mixing element 122 through the plurality of perforations 212. This may allow for a reduction in backpressure in the exhaust flowing towards the exhaust outlet 118 or the NOx sensor 120. In the illustrated embodiment, the plurality of perforations 212 is provided in a manner such that the perforations 212 are aligned with the positioning of the vanes 208 on the base plate 202. In the illustrated embodiment, each of the plurality of perforations 212 has a circular configuration. Alternatively, the plurality of perforations 212 may be formed as vertical or horizontal slots, squares, rectangles, crosses and so on. In another embodiment, a central hole may be provided on the base plate 202. It should be noted that shape, size, location and arrangement of the plurality of perforations 212 on the base plate 202 may vary as per system design and configuration.

INDUSTRIAL APPLICABILITY

The NOx sensor located downstream of the SCR catalysts is used for measuring the concentration of nitrogen oxides in the exhaust. The concentration of the nitrogen oxides may in turn be used to determine an amount of the diesel exhaust fluid (DEF) dosing to be provided in the exhaust by the DEF module of the aftertreatment system. In order for the DEF module to perform efficiently, it is required that an output of the NOx sensor provided downstream of the SCR module is consistent without considerable noise and/or sudden surges. This may be achieved by providing the exhaust to the NOx sensor located downstream of the SCR module having substantially homogenized concentration of the nitrogen oxides.

Known systems include providing the mixing element downstream of the DEF module and upstream of the SCR module. This location of the mixing element provides for mixing of the exhaust prior to the exhaust entering into the SCR catalysts.

The mixing element 122 disclosed herein may be utilized for mixing and homogenizing the exhaust downstream of the SCR catalysts 112. The mixing element 122 provides for an effective mixing and homogenization of the exhaust within a confined space of the module 100. Further, design and configuration of the mixing element 122 prevents considerable backpressure in the exhaust.

Figure 4:
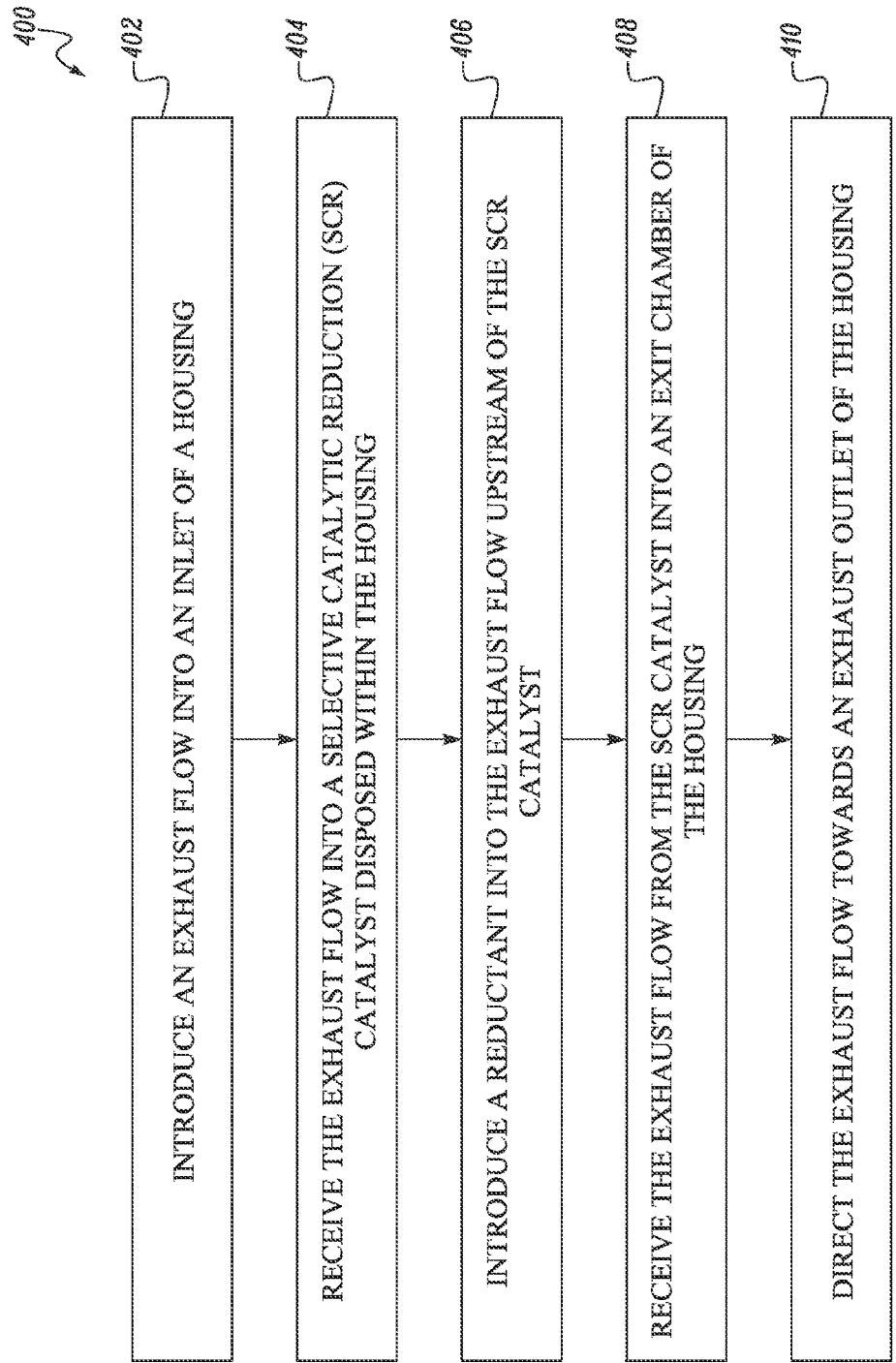
FIGS. 4 and 5 are flowcharts of exemplary methods utilizing the exemplary embodiment of the mixing element of FIG. 2.
Figure 5:
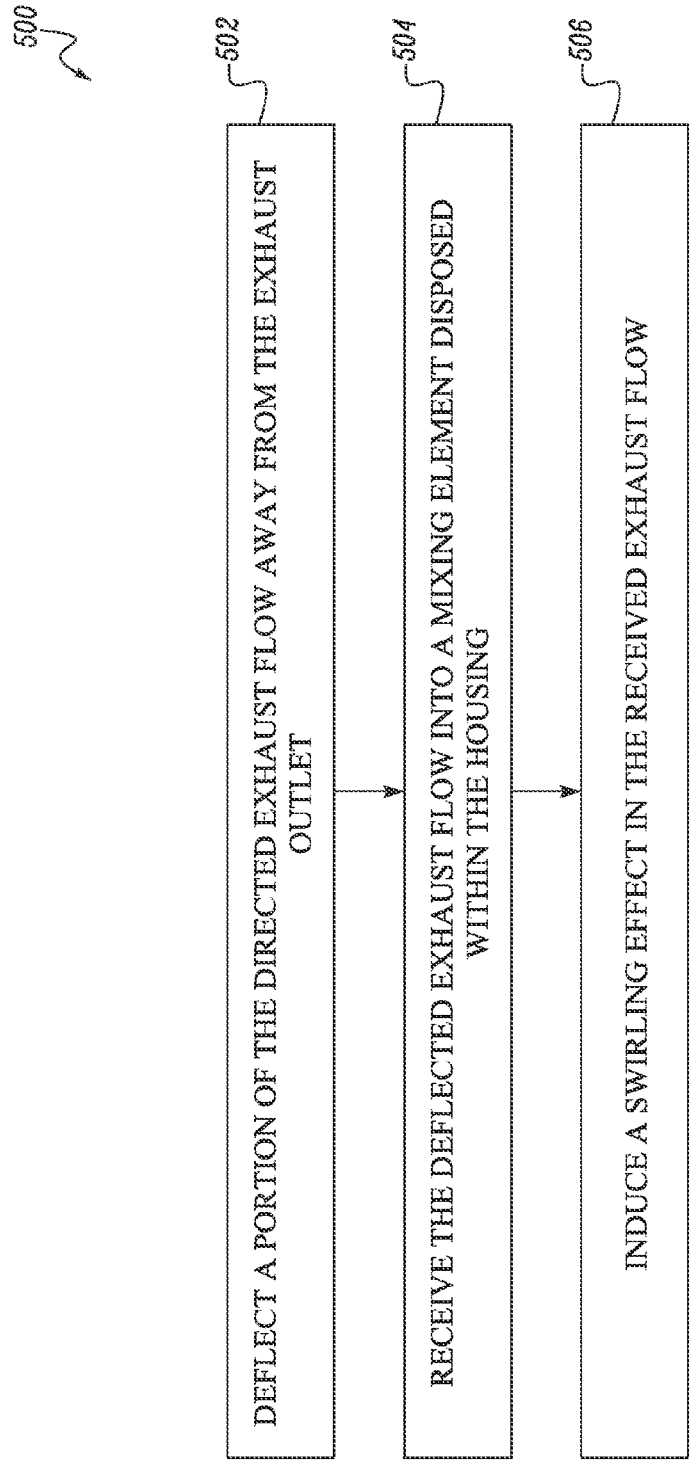

FIGS. 4 and 5 illustrate exemplary methods 400, 500 of mixing the exhaust downstream of the SCR catalysts 112. As shown in FIG. 4, at step 402, the exhaust is introduced into the exhaust inlet 108 of the housing 102. At step 404, the exhaust is received into the SCR inlet 114 of the SCR catalyst 112 disposed within the housing 102. At step 406, the reductant is introduced into the exhaust upstream of the SCR outlet 116. A person of ordinary skill in the art will appreciate that the reductant may be introduced using any known method in the art. At step 408, the exhaust is received from the SCR outlet 116 into the exit chamber 117 of the housing 102. At step 410, the exhaust is directed towards the exhaust outlet 118 of the housing 102.

FIG. 5 illustrates the method 500 of directing the exhaust towards the exhaust outlet 118 in detail. At step 502, the portion of the exhaust is deflected away from the exhaust outlet 118. More specifically, the exhaust may compact against the base plate 202 of the mixing element 122, causing the compacted exhaust to be deflected substantially perpendicular to the longitudinal axis X-X of the mixing element 122. In one embodiment, some portion of the deflected exhaust may re-enter into the exit chamber 117.

At step 504, at least the portion of the deflected exhaust may be received into the mixing element 122. The deflection of the exhaust on compacting or hitting against the base plate 202 of the mixing element 122 may cause a change in direction of the deflected exhaust, resulting in the deflected exhaust being received into the windows 210 defined between the each of the plurality of vanes 208. In one embodiment, some portion of the exhaust may directly be received into the mixing element 122 through the plurality of perforations 212 provided on the base plate 202.

At step 506, the swirling effect is induced within the received exhaust. The swirling effect provides mixing and homogenization of the exhaust received into the mixing element 122. The homogenized exhaust may be discharged from the exhaust outlet 118 of the housing 102. In one embodiment, the homogenized exhaust flow may be received into the NOx sensor 120.

Though the mixing element 122 disclosed herein is described in relation to the aftertreatment system of the engine, it should be noted that the mixing element 122 may be employed for other alternate applications. The alternate applications may include industries including, but not limited to, chemicals, oil and gas, pharmaceuticals, dairy and food, and so on. The alternate applications may include mixing and homogenization of mixtures containing two or more combinations of gas-gas constituents, gas-liquid constituents and/or liquid-liquid constituents.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. An aftertreatment system housing comprising:
   an exhaust inlet configured to receive an exhaust flow;
   a Selective Catalytic Reduction (SCR) module disposed within the housing, wherein the SCR module is configured to introduce a reductant into the exhaust flow;
   a nitrogen oxide sensor disposed downstream of the SCR module, the nitrogen oxide sensor configured to measure a nitrogen oxide content of the exhaust flow exiting the housing;
   an exhaust outlet configured to emit the exhaust flow out of the housing; and
   a mixing element disposed between the SCR module and the nitrogen oxide sensor, the mixing element being disposed in fluid communication with the exhaust outlet, wherein the mixing element is configured to substantially homogenize the exhaust flow upstream of the nitrogen oxide sensor, the mixing element comprising:
      a base plate having an upper surface and a lower surface, the base plate configured to deflect a portion of a flow of a fluid around the upper surface thereof; and
      a plurality of vanes attached to the lower surface of the base plate, the plurality of vanes being provided in a spaced apart arrangement, wherein the plurality of vanes is configured to induce a swirling effect in a flow of the fluid received therebetween.

2. The system of claim 1, wherein the mixing element is at least partially disposed within the housing.

3. The system of claim 1, wherein each of the plurality of vanes has an airfoil shaped cross section.

4. The system of claim 1, wherein the plurality of vanes are disposed such that a leading edge of each of the plurality of vanes face an outside of the base plate, the plurality of vanes being positioned substantially equidistant from one another about a periphery of the base plate and defining windows therebetween for receiving the portion of the flow of the fluid therein.

5. The system of claim 1 further comprising a plurality of perforations formed on the base plate, the plurality of perforations configured to allow a portion of the flow of the fluid to be received into the mixing element.

6. The system of claim 5, wherein the plurality of perforations is provided in alignment with the plurality of vanes.

7. The system of claim 5, wherein a hole is provided centrally on the base plate.

8. A method comprising:
   introducing an exhaust flow into an exhaust inlet of a housing;
   receiving the exhaust flow into a Selective Catalytic Reduction (SCR) catalyst disposed within the housing;
   introducing a reductant into the exhaust flow upstream of the SCR catalyst;
   receiving the exhaust flow from the SCR catalyst into an exit chamber of the housing; and
   directing the exhaust flow towards an exhaust outlet of the housing,
   wherein the directing the exhaust flow comprises:
      deflecting a portion of the directed exhaust flow away from the exhaust outlet;
      receiving the deflected exhaust flow into a mixing element disposed within the housing; and
      inducing a swirling effect in the received exhaust flow.

9. The method of claim 8, wherein the directing the exhaust flow further comprises exiting the exhaust flow from the exhaust outlet.

10. The method of claim 8 further comprising receiving the exhaust flow from the exhaust outlet into a nitrogen oxide sensor.

11. The method of claim 8 further comprising allowing a portion of the exhaust flow to be directly received into the mixing element.

\* \* \* \* \*